(12) United States Patent
Sugimoto (10) Patent No.: US 11,326,546 B2
(45) Date of Patent: May 10, 2022

(54) CONTROLLER FOR INTERNAL COMBUSTION ENGINE, CONTROL METHOD FOR INTERNAL COMBUSTION ENGINE, AND MEMORY MEDIUM

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/373,780

(22) Filed: Jul. 13, 2021

(65) Prior Publication Data
US 2022/0065187 A1     Mar. 3, 2022

(30) Foreign Application Priority Data

Aug. 28, 2020  (JP) .............................. JP2020-144356

(51) Int. Cl.
| | | |
|---|---|---|
| *F02D 41/40* | (2006.01) | |
| *F02D 41/00* | (2006.01) | |
| *F02D 41/02* | (2006.01) | |
| *F02D 31/00* | (2006.01) | |
| *F02D 13/02* | (2006.01) | |

(Continued)

(52) U.S. Cl.
CPC ....... *F02D 41/401* (2013.01); *F02D 13/0234* (2013.01); *F02D 31/007* (2013.01); *F02D 41/0085* (2013.01); *F02D 41/024* (2013.01); *F02D 41/1475* (2013.01); *F02D 13/06* (2013.01); *F02D 17/02* (2013.01); *F02D 41/0087* (2013.01); *F02D 2041/0012* (2013.01); *F02D 2041/389* (2013.01)

(58) Field of Classification Search
CPC .. F02D 41/401; F02D 13/0234; F02D 31/007; F02D 41/0085; F02D 41/024; F02D 41/1475; F02D 2041/389
See application file for complete search history.

(56) References Cited

U.S. PATENT DOCUMENTS

| 10,801,383 B1* | 10/2020 | Rackmil ............. F02D 41/0087 |
| 2004/0060284 A1* | 4/2004 | Roberts, Jr. ........... F01N 3/0842 |
| | | 60/284 |

(Continued)

FOREIGN PATENT DOCUMENTS

| JP | H6207546 A | 7/1994 |
| JP | H10115234 A | 5/1998 |

*Primary Examiner* — Carl C Staubach
(74) *Attorney, Agent, or Firm* — Hauptman Ham, LLP (57) ABSTRACT

A controller for an internal combustion engine, a control method for an internal combustion engine, and a memory medium are provided. The controller determines whether an execution request of a temperature-increasing process for an aftertreatment device for exhaust gas has been issued. When the execution request is determined as having been issued, supply of fuel by a fuel injection valve corresponding to a specified cylinder is deactivated. The specified cylinder is one of cylinders. An air-fuel ratio of air-fuel mixture in a cylinder of the cylinders that differs from the specified cylinder is set to be richer than a stoichiometric air-fuel ratio. When the temperature-increasing process is executed, an adjustment device is operated so as to reduce the fuel concentration in an intake port connected to the specified cylinder.

8 Claims, 7 Drawing Sheets

(51) Int. Cl.
*F02D 41/14* (2006.01)
*F02D 41/38* (2006.01)
*F02D 13/06* (2006.01)
*F02D 17/02* (2006.01)

(56) References Cited

U.S. PATENT DOCUMENTS

| | | | | |
|---|---|---|---|---|
| 2004/0216449 | A1* | 11/2004 | Szymkowicz | F01N 3/2006 60/284 |
| 2005/0205049 | A1* | 9/2005 | Lewis | F01L 13/0005 123/198 DB |
| 2014/0026872 | A1* | 1/2014 | Kerns | F02D 41/0065 123/568.11 |
| 2014/0041362 | A1 | 2/2014 | Ulrey et al. | |
| 2017/0159581 | A1* | 6/2017 | McCarthy, Jr. | F02D 13/06 |

* cited by examiner

CONTROLLER FOR INTERNAL COMBUSTION ENGINE, CONTROL METHOD FOR INTERNAL COMBUSTION ENGINE, AND MEMORY MEDIUM

RELATED APPLICATIONS

The present application claims priority of Japanese Application Number 2020-144356, filed on Aug. 28, 2020, the disclosure of which is hereby incorporated by reference herein in its entirety.

BACKGROUND

1. Field

The present disclosure relates to a controller for an internal combustion engine, a control method for an internal combustion engine, and a memory medium.

2. Description of Related Art

U.S. Patent Application Publication No. 2014/0041362 discloses an exhaust purifying apparatus for a spark-ignition vehicle on-board internal combustion engine. The exhaust purifying apparatus includes a filter that traps particulate matter (PM) and a catalytic device on the upstream side of the filter in an exhaust passage. The exhaust purifying apparatus draws unburned air-fuel mixture into the catalytic device by injecting fuel with the spark discharge of an ignition device deactivated while the vehicle is coasting.

When the unburned air-fuel mixture is drawn, the air-fuel mixture burns in the catalytic device so as to increase the temperature of the catalytic device (hereinafter referred to as catalyst temperature). Such an increase in the catalyst temperature increases the temperature of gas flowing out of the catalytic device and flowing into the filter. When the heat of the high-temperature gas causes the temperature of the filter to become higher than or equal to the ignition point of the PM, the PM deposited in the filter burns.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: The present disclosure provides a controller for an internal combustion engine. The controller controls the internal combustion engine including cylinders. The internal combustion engine includes an adjustment device, an exhaust passage, and an aftertreatment device for exhaust gas. The aftertreatment device is arranged in the exhaust passage. The adjustment device is configured to adjust a fuel concentration in an intake port connected to a specified cylinder during a specified-cylinder deactivation period. The specified cylinder is one of the cylinders. The specified-cylinder deactivation period is a period during which supply of fuel by a fuel injection valve corresponding to the specified cylinder is deactivated. The controller is configured to execute: a determination process that determines whether an execution request of a temperature-increasing process for the aftertreatment device has been issued; the temperature-increasing process that deactivates the supply of the fuel by the fuel injection valve corresponding to the specified cylinder and sets an air-fuel ratio of air-fuel mixture in a cylinder of the cylinders that differs from the specified cylinder to be richer than a stoichiometric air-fuel ratio when the determination process determines that the execution request has been issued; and an operation process that operates the adjustment device so as to reduce the fuel concentration in the intake port connected to the specified cylinder when the temperature-increasing process is executed.

In the above-described configuration, when the fuel in the intake port connected to the specified cylinder flows into the specified cylinder, the fuel may be burned so that at least some of the combustion energy may be converted into the power of the crankshaft. During the execution of the temperature-increasing process, when the fuel concentration increases in the intake port connected to the specified cylinder, there is a possibility that the fuel in the intake port connected to the specified cylinder should be the fuel of air-fuel mixture in a cylinder that differs from the specified cylinder. This may lower the concentration of unburned fuel that should be exposed to the discharge passage from the cylinder that differs from the specified cylinder, and may consequently lower the efficiency of increasing the temperature of the aftertreatment device.

In the above-described configuration, when the temperature-increasing process is executed, the adjustment device is operated so as to reduce the fuel concentration in the intake port connected to the specified cylinder. This prevents an unintentional decrease in the concentration of unburned fuel discharged to the discharge passage from the cylinder that differs from the specified cylinder and used to increase the temperature of the aftertreatment device. Consequently, the efficiency of the temperature-increasing process is kept high.

The inventor examined supplying unburned fuel and oxygen into exhaust gas by deactivating combustion control only in a specified cylinder and increasing the air-fuel ratio of the remaining cylinders to be richer than the stoichiometric air-fuel ratio in order to execute the temperature-increasing process for the aftertreatment device when the shaft torque of the internal combustion engine is not zero. As a result, the inventor found out that the temperature-increasing efficiency might be lowered when the unburned fuel in the enriched cylinder flows into the cylinders in which the combustion control is deactivated. Such a problem is overcome by the above-described configuration.

Aspect 2: In the controller according to Aspect 1, the fuel injection valve includes a direct injection valve that directly injects fuel into one of the cylinders and a port injection valve that injects fuel into the intake port. The adjustment device includes the fuel injection valve. The controller is further configured to execute: a setting process that sets an injection distribution ratio in correspondence with a running state of the internal combustion engine, the injection distribution ratio being a ratio of an amount of fuel supplied by the port injection valve to an amount of fuel supplied to the cylinder using the fuel injection valve; and an injection distribution process that operates the direct injection valve and the port injection valve in reference to the injection distribution ratio, and the operation process includes the injection distribution process that operates the direct injection valve and the port injection valve such that a value of the injection distribution ratio obtained when the temperature-increasing process is executed becomes smaller than a value of the injection distribution ratio set by the setting process.

Some of the fuel injected from the port injection valve tends to collect in the intake system, including the intake port and the intake valve, without flowing into the combustion chamber. Thus, when the temperature-increasing process is executed, some of the fuel injected from the port injection valve in order to supply fuel to a cylinder that differs from the specified cylinder may collect in the intake system and then flow into the specified cylinder. The amount of fuel on the intake system can be reduced by reducing the injection distribution ratio. Thus, in the above-described configuration, when the temperature-increasing process is executed, the actual injection distribution ratio is set to be smaller than the injection distribution ratio set by the setting process, which is the injection distribution ratio obtained when the temperature-increasing process is not executed. This prevents the fuel that should be supplied into the cylinder different from the specified cylinder from flowing into the specified cylinder.

Aspect 3: In the controller according to Aspect 1, the fuel injection valve includes a port injection valve that injects fuel into the intake port. The adjustment device includes the port injection valve. The controller is configured to execute a supplying process that supplies fuel into one of the cylinders using the port injection valve through at least one of intake synchronous injection or intake asynchronous injection. The intake synchronous injection injects fuel in synchronization with an open period of an intake valve. The intake asynchronous injection injects fuel at a timing advanced with respect to a timing of the intake synchronous injection. The operation process includes the supplying process that operates the port injection valve such that a ratio of a synchronous injection amount to a sum of the synchronous injection amount and an asynchronous injection amount increases when the temperature-increasing process is executed. The synchronous injection amount is an injection amount obtained through the intake synchronous injection. The asynchronous injection amount is an injection amount obtained through the intake asynchronous injection.

The intake valve has not opened yet at the point in time delayed, with respect to the injection timing of the intake asynchronous injection, by the time needed for the fuel spray injected through the intake asynchronous injection to reach the vicinity of the intake valve. Thus, the fuel injected through the intake asynchronous injection tends to collect in the intake system, such as the in the intake port or the intake valve. Accordingly, when the intake asynchronous injection is executed during the temperature-increasing process, the fuel that should be drawn into a cylinder that differs from the specified cylinder may collect in the intake system and then flow into the specified cylinder. The intake valve is open at the point in time when the fuel injected through the intake synchronous injection reaches the vicinity of the intake valve. This allows the fuel injected through the intake synchronous injection to easily flow into the cylinder without collecting in the intake system.

In the above-described configuration, when the temperature-increasing process is executed, the ratio of the intake synchronous injection is increased. This prevents the fuel that should be drawn into a cylinder that differs from the specified cylinder from collecting in the intake system and then flowing into the specified cylinder.

Aspect 4: In the controller according to Aspect 1 or 2, the fuel injection valve includes a port injection valve that injects fuel into the intake port. The adjustment device includes the port injection valve. The controller is configured to execute a supplying process that supplies fuel into one of the cylinders using the port injection valve through at least one of intake synchronous injection or intake asynchronous injection. The intake synchronous injection injects fuel in synchronization with an open period of an intake valve. The intake asynchronous injection injects fuel at a timing advanced with respect to a timing of the intake synchronous injection. The operation process includes the supplying process that operates the port injection valve while advancing an injection timing of fuel through the intake asynchronous injection when the temperature-increasing process is executed.

The intake valve has not opened yet at the point in time delayed, with respect to the injection timing of the intake asynchronous injection, by the time needed for the fuel spray injected through the intake asynchronous injection to reach the vicinity of the intake valve. Thus, the fuel injected through the intake asynchronous injection tends to collect in the intake system, such as in the intake port or the intake valve. Accordingly, when the intake asynchronous injection is executed during the temperature-increasing process, the fuel that should be drawn into a cylinder that differs from the specified cylinder may collect in the intake system and then flow into the specified cylinder.

In the above-described configuration, when the temperature-increasing process is executed, the injection timing of the intake asynchronous injection is advanced. Thus, of the fuel in the intake system, the ratio of the amount atomized during a period in which the intake valve is open. Accordingly, of the fuel injected through the intake asynchronous injection, the amount of fuel that remains in the intake system without flowing into the cylinder that differs from the specified cylinder is reduced.

Aspect 5: In the controller according to Aspect 3 or 4, the adjustment device includes a device that adjusts a rotation speed of the crankshaft of the internal combustion engine. The operation process includes an increasing process that increases the rotation speed of the crankshaft by operating the adjustment device when the temperature-increasing process is executed.

Of the fuel injected through the intake asynchronous injection, the amount of fuel that collects in the intake system and thus does not flow into the cylinder during a period in which the intake valve corresponding to the intake asynchronous injection is open tends to be larger when the flow speed of intake air flowing from the intake passage into a cylinder is high than when the flow speed is low. In the above-described configuration, when the temperature-increasing process is executed, the rotation speed of the crankshaft increases. Thus, as compared with when the rotation speed of the crankshaft is not increased, the flow speed of intake air flowing from the intake passage into the cylinder becomes higher. This ultimately reduces the amount of fuel flowing into the cylinder during the period in which the corresponding intake valve is open.

Aspect 6: In the controller according to Aspect 1, the adjustment device includes a valve actuation variable device that adjusts a closing timing of an intake valve. The operation process includes a process that advances the closing timing when the temperature-increasing process is executed.

As the closing timing of the intake valve becomes retarded with respect to bottom dead center, a larger amount of the air-fuel mixture tends to flow out from a cylinder to the intake port during the open period of the intake valve. Thus, when the closing timing of the intake valve is retarded during the temperature-increasing process, a decrease may occur in the amount of fuel that should be discharged to the discharge passage as unburned fuel from a cylinder that differs from the specified cylinder. In the above-described configuration, when the temperature-increasing process is executed, the closing timing of the intake valve is advanced. This prevents the fuel in the cylinder that differs from the specified cylinder from flowing out to the intake port.

Aspect 7: A control method for an internal combustion engine including the processes according to any one of Aspects 1 to 6 is provided.

Aspect 8. A non-transitory computer-readable memory medium that stores a control process that causes the processor to execute the processes according to Aspects 1 to 6 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to FIGS. 1 to 3.

Figure 1:
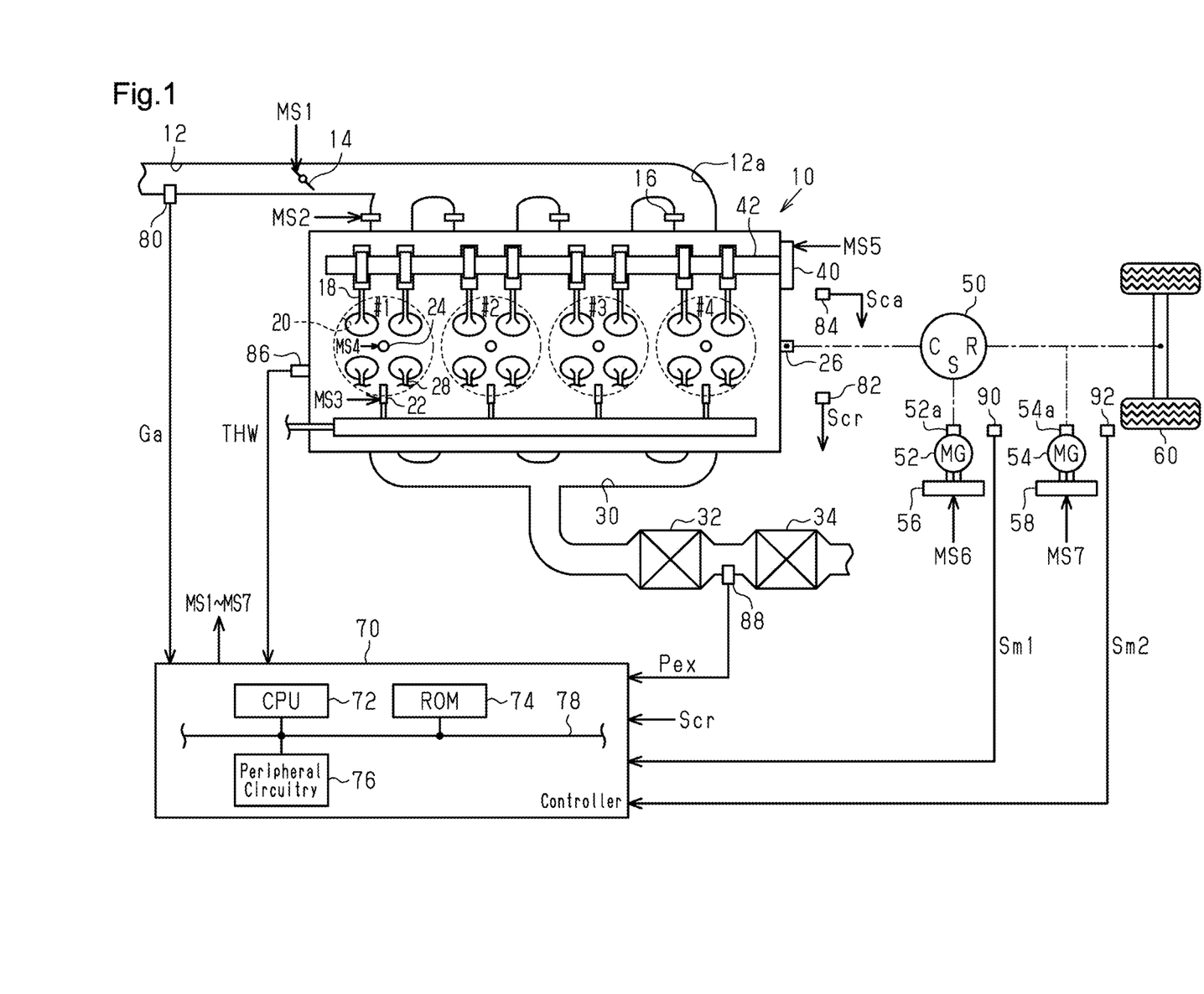
FIG. 1 is a diagram showing a controller and a drive system according to a first embodiment.

As shown in FIG. 1, an internal combustion engine 10 includes four cylinders, namely, cylinders #1 to #4. The internal combustion engine 10 includes an intake passage 12 provided with a throttle valve 14. An intake port 12a at a downstream portion of the intake passage 12 includes port injection valves 16. Each of the port injection valve 16 injects fuel into the intake port 12a. The air drawn into the intake passage 12 and the fuel injected from the port injection valves 16 flow into combustion chambers 20 as intake valves 18 open. The fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32 having an oxygen storage capacity and includes a gasoline particulate filter (GPF) 34. In the GPF 34 of the present embodiment, it is assumed that a three-way catalyst is supported by a PM-trapping filter.

The intake valves 18 are selectively opened and closed by the rotation power of an intake camshaft 42. The rotation power of the crankshaft 26 is transmitted to the intake camshaft 42 through a variable valve timing device 40. The variable valve timing device 40 is an actuator that adjusts a relative rotation phase difference of the intake camshaft 42 relative to the crankshaft 26.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. A rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54.

The internal combustion engine 10 is controlled by a controller 70. In order to control the controlled variables of the internal combustion engine 10 (for example, torque or exhaust component ratio), the controller 70 operates operation units of the internal combustion engine 10 such as the throttle valve 14, the port injection valves 16, the direct injection valves 22, the ignition plug 24, and the variable valve timing device 40. Further, the controller 70 controls the first motor generator 52, and operates the inverter 56 in order to control the rotation speed of the first motor generator 52, which is the controlled variable of the first motor generator 52. Furthermore, the controller 70 controls the second motor generator 54, and operates the inverter 58 in order to control the torque of the second motor generator 54, which is the controlled variable of the second motor generator 54. FIG. 1 shows operation signals MS1 to MS7 that correspond to the throttle valve 14, the port injection valve 16, the direct injection valves 22, the ignition plugs 24, the variable valve timing device 40, the inverter 56, and the inverter 58, respectively. In order to control the controlled variables of the internal combustion engine 10, the controller 70 refers to an intake air amount Ga detected by an air flow meter 80, an output signal Scr of a crank angle sensor 82, an output signal Sca of a cam angle sensor 84, a water temperature THW detected by a water temperature sensor 86, and a pressure Pex of exhaust gas flowing into the GPF 34. The pressure Pex is detected by an exhaust pressure sensor 88. Additionally, in order to control the controlled variables of the first motor generator 52 and the second motor generator 54, the controller 70 refers to an output signal Sm1 of a first rotation angle sensor 90 and an output signal Sm2 of a second rotation angle sensor 92. The output signal Sm1 is used to detect the rotation angle of the first motor generator 52. The output signal Sm2 is used to detect the rotation angle of the second motor generator 54.

The controller 70 includes a CPU 72, a ROM 74, and peripheral circuitry 76. These components are capable of communicating with one another via a communication line 78. The peripheral circuitry 76 includes, for example, a circuit that generates a clock signal which regulates operations inside the controller 70, a power supply circuit, and a reset circuit. The controller 70 controls the above-described controlled variables by causing the CPU 72 to execute programs stored in the ROM 74.

Figure 2:
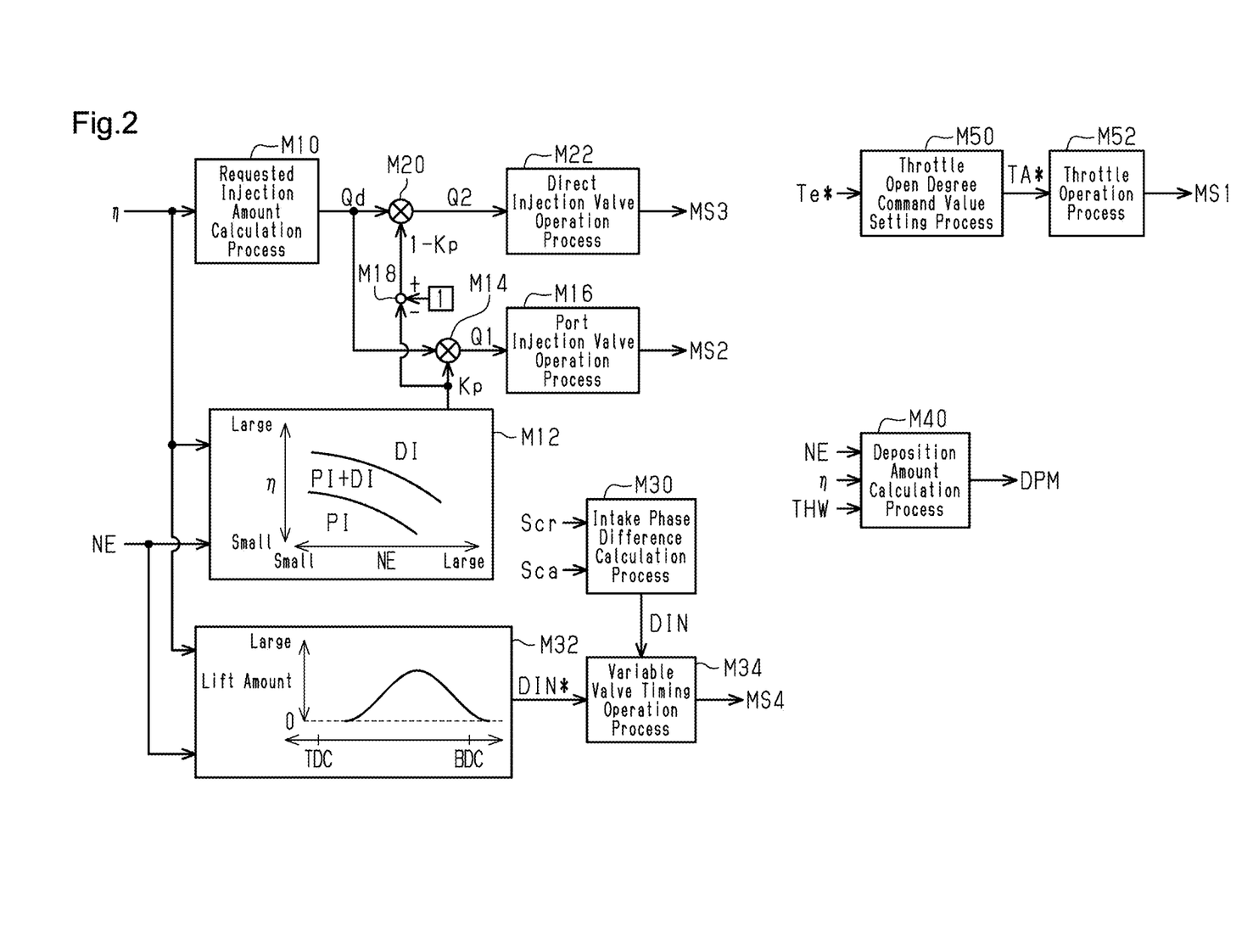
FIG. 2 is a block diagram showing processes executed by the controller of the embodiment.

FIG. 2 shows the processes executed by the controller 70. The processes shown in FIG. 2 are executed by the CPU 72 repeatedly executing programs stored in the ROM 74, for example, in a predetermined cycle.

A requested injection amount calculation process M10 calculates a requested injection amount Qd in reference to a charging efficiency η. The charging efficiency η is calculated by the CPU 72 in reference to the intake air amount Ga.

A setting process M12 sets an injection distribution ratio Kp using a rotation speed NE and the charging efficiency η as inputs. The injection distribution ratio Kp is the ratio of the amount of fuel injected from the port injection valve 16 to the requested injection amount Qd when the fuel of the requested injection amount Qd is injected by the port injection valve 16 and the direct injection valve 22. The rotation speed NE is calculated by the CPU 72 using the output signal Scr as an input. In FIG. 2, the fuel injection performed by the port injection valve 16 is described as PI, and the fuel injection performed by the direct injection valve 22 is described as DI. That is, in the present embodiment, in a low-speed and low-load region, the injection distribution ratio Kp is set to 1 and the fuel of the requested injection amount Qd is injected only using the port injection valve 16. In a high-speed and high-load region, the injection distribution ratio Kp is set to 0 and the fuel of the requested injection amount Qd is injected only using the direct injection valve 22. In an intermediate region between the low-speed and low-load region and the high-speed and high-load region, the injection distribution ratio Kp is set to be greater than 0 and less than 1 and the total amount of fuel injected by the port injection valve 16 and the direct injection valve 22 is set as the requested injection amount Qd.

More specifically, the setting process M12 simply needs to be executed by the CPU 72 performing map calculation of the injection distribution ratio Kp. The map calculation is performed with the ROM 74 storing, in advance, map data that includes the rotation speed NE and the charging efficiency η as input variables and includes the injection distribution ratio Kp as an output variable. The map data refers to a data set of discrete values of input variables and values of output variables that respectively correspond to the values of the input variables. For example, in the map calculation, when the value of an input variable matches one of the values of input variables on the map data, the value of the corresponding output variable of the map data is used as the calculation result. In the map calculation, when the value of the input variable does not match any of the values of the input variable on the map data, a value obtained by interpolation of multiple values of the output variable included in the map data simply needs to be used as the calculation result.

A multiplication process M14 multiplies the injection distribution ratio Kp by the requested injection amount Qd so as to calculate a port injection amount Q1, which is the amount of injection performed by the port injection valve 16. A port injection valve operation process M16 outputs the operation signal MS2 to the port injection valve 16 in order to operate the port injection valve 16 such that the fuel injected by the port injection valve 16 has a value corresponding to the port injection amount Q1.

A direct injection coefficient calculation process M18 subtracts the injection distribution ratio Kp from 1 so as to calculate a coefficient that defines an injection ratio of the direct injection valve 22. A multiplication process M20 multiplies an output value of the direct injection coefficient calculation process M18 by the requested injection amount Qd so as to calculate a direct injection amount Q, which is the amount of injection performed by the direct injection valve 22. A direct injection valve operation process M22 outputs the operation signal MS3 to the direct injection valve 22 in order to operate the direct injection valve 22 such that the fuel injected from the direct injection valve 22 has a value corresponding to the direct injection amount Q2.

An intake phase difference calculation process M30 calculates a target intake phase difference DIN using the output signals Scr, Sca as inputs. The intake phase difference DIN is a relative rotation difference of the rotation angle of the intake camshaft 42 relative to the rotation angle of the crankshaft 26.

An intake phase difference command value setting process M32 uses the rotation speed NE and the charging efficiency η to set an intake phase difference command value DIN*, which is a command value of the intake phase difference DIN. In the present embodiment, the opening timing of the intake valve 18 is basically retarded with respect to compression top dead center (TDC), and the closing timing of the intake valve 18 is basically retarded with respect to bottom dead center (BDC). The closing timing of the intake valve 18 is set to be retarded with respect to BDC because the Atkinson cycle is employed. The intake phase difference command value DIN* simply needs to be set by, for example, the CPU 72 performing map calculation of the intake phase difference command value DIN* with the ROM 74 storing the rotation speed NE and the charging efficiency η as input variables and the intake phase difference command value DIN* as an output variable.

A variable valve timing operation process M34 outputs the operation signal MS4 to the variable valve timing device 40 so as to operate the variable valve timing device 40, thereby performing feedback control to set the intake phase difference DIN to the intake phase difference command value DIN*.

A deposition amount calculation process M40 uses the rotation speed NE, the charging efficiency η, and the water temperature THW to calculate a deposition amount DPM. The deposition amount DPM is the amount of PM trapped by the GPF 34. The deposition amount calculation process M40 simply needs to include, for example, a process that uses the rotation speed NE, the charging efficiency η, and the water temperature THW to calculate the amount of PM in exhaust gas and a process that uses the rotation speed NE, the charging efficiency η, and the amount of PM in exhaust gas to calculate an update amount of the deposition amount DPM.

A throttle open degree command value setting process M50 sets a throttle open degree command value TA*, which is a command value of the open degree of the throttle valve 14, using an engine torque command value Te*, which is a command value of the torque for the internal combustion engine 10, as an input. A throttle operation process M52 uses the throttle open degree command value TA* to operate the open degree of the throttle valve 14.

Figure 3:
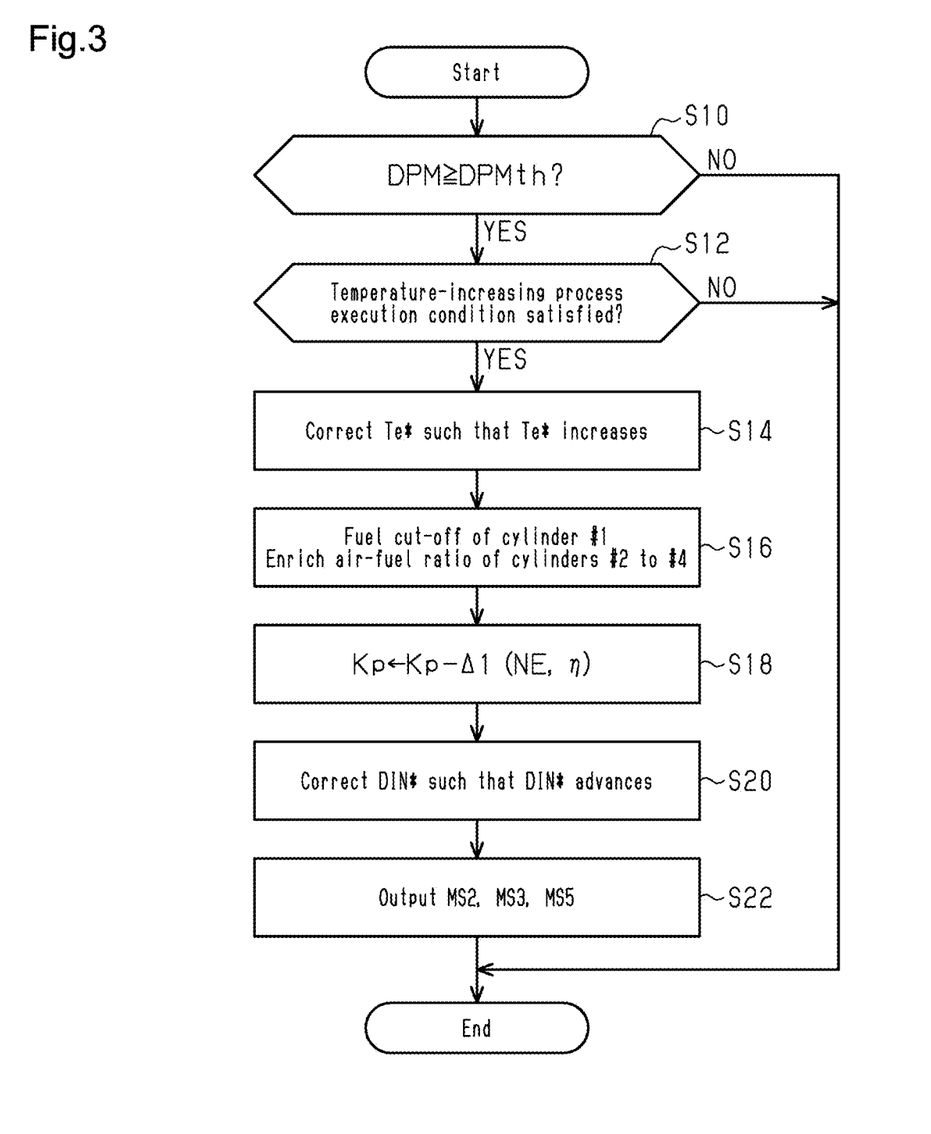
FIG. 3 is a flowchart showing a procedure of processes executed by the controller of the embodiment.

FIG. 3 illustrates a procedure of processes executed by the controller 70. The processes shown in FIG. 3 are executed by the CPU 72 repeatedly executing programs stored in the ROM 74, for example, in a predetermined cycle. In the following description, the number of each step is represented by the letter S followed by a numeral.

In a series of processes shown in FIG. 3, the CPU 72 first determines whether the deposition amount DPM is greater than or equal to a threshold value DPMth (S10). When determining that the deposition amount DPM is greater than or equal to the threshold value DPMth (S10: YES), the CPU 72 determines whether a condition for executing a temperature-increasing process is satisfied (S12). The temperature-increasing process increases the temperature of the GPF 34 in order to burn and remove the PM trapped by the GPF 34. The condition for executing the temperature-increasing process simply needs to include, for example, a condition in which an anomaly diagnosis process has not been performed. The anomaly diagnosis process diagnoses whether the determination accuracy is lowered by fuel cut-off of cylinder #1 (described below).

When determining that the condition for executing the temperature-increasing process is satisfied (S12: YES), the CPU 72 corrects the engine torque command value Te* such that the value increases (S14).

Then, the CPU 72 deactivates the injection of fuel from the port injection valve 16 of cylinder #1 and deactivates the injection of fuel from the direct injection valve 22 of cylinder #1 so that the air-fuel ratio of the air-fuel mixture in the combustion chambers 20 of cylinders #2 to #4 becomes richer than the stoichiometric air-fuel ratio (S16). This process causes oxygen and unburned fuel to be discharged to the exhaust passage 30 so as to increase the temperature of the GPF 34, thereby burning and removing the PM trapped by the GPF 34. That is, this process causes oxygen and unburned fuel to be discharged to the exhaust passage 30 so as to burn the unburned fuel in the three-way catalyst 32 and thus increase the temperature of exhaust gas, thereby increasing the temperature of the GPF 34. Additionally, the supplying of oxygen into the GPF 34 allows the PM trapped by the GPF 34 to be burned and removed. In this mode, cylinder #1 is a specified cylinder serving as one of cylinders #1 to #4. Cylinders #2 to #4 are different from the specified cylinder #1. A specified-cylinder deactivation period refers to a period during which the supply of fuel by the port injection valve 16 and the direct injection valve 22 corresponding to cylinder #1 (specified cylinder) is deactivated. That is, the process of S16 deactivates the injection of fuel from the port injection valve 16 of cylinder #1 and deactivates the injection of fuel from the direct injection valve 22 of cylinder #1 so as to perform fuel cut-off of cylinder #1.

In the process of S14, the increase correction of the engine torque command value Te* simply needs to be performed such that an output per combustion cycle of the internal combustion engine 10 is increased by a deficient amount of the combustion energy in cylinder #1.

Next, the CPU 72 substitutes, into the injection distribution ratio Kp used to calculate the port injection amount Q1 and the direct injection amount Q2, a value obtained by subtracting a predetermined amount Δ1 from the injection distribution ratio Kp that has been set by the setting process M12 (S18). This process prevents fuel from collecting in portions corresponding to cylinders #2 to #4 in the intake system including the intake port 12*a* and the intake valve 18. That is, some of the fuel injected from the port injection valve 16 remains in the intake system without flowing into an intended cylinder during the open period of the intake valve 18. The fuel that remains in the intake system may be atomized to flow into cylinder #1 as the intake valve 18 of cylinder #1 opens, so that the fuel may be burned through spontaneous ignition or the like in cylinder #1. When the fuel used for the temperature-increasing process is burned in cylinder #1, at least some of the combustion energy produced by the combustion in cylinder #1 is converted into the power of the crankshaft 26 and thus does not contribute to increasing the temperature of the exhaust system. During the temperature-increasing process, the ignition plug 24 may be used to execute spark discharge in order to burn the unburned fuel that remains in cylinder #1.

More specifically, the CPU 72 variably sets the predetermined amount Δ1 in correspondence with the rotation speed NE and the charging efficiency η, which are the same as the variables used by the setting process M12 to define the injection distribution ratio Kp. The predetermined amount Δ1 is less than or equal to the injection distribution ratio Kp set by the setting process M12. For example, this process simply needs to be executed by the CPU 72 performing map calculation of the predetermined amount Δ1 with the ROM 74 storing, in advance, map data that includes the rotation speed NE and the charging efficiency η as input variables and includes the predetermined amount Δ1 as an output variable.

In addition, the CPU 72 corrects the intake phase difference command value DIN* set by the intake phase difference command value setting process M32 such that the value advances (S20). This process is performed to advance the timing of closing the intake valve 18.

Subsequently, the CPU 72 respectively outputs the operation signals MS2, MS3 to the port injection valve 16 and the direct injection valve 22 in order to inject the fuel corresponding to the injection distribution ratio Kp, and outputs the operation signal MS5 to the variable valve timing device 40 in order to control the intake phase difference DIN to the corrected intake phase difference command value DIN* (S22).

When completing the process of S22 or when making a negative determination in the process of S10 or S12, the CPU 72 temporarily ends the series of processes shown in FIG. 3. The temperature-increasing process simply needs to be ended when the deposition amount DPM becomes less than or equal to a given amount. Whether the deposition amount DPM becomes less than or equal to the given amount may be determined by executing, for example, a process that calculates the deposition amount DPM by additionally defining the update amount of the deposition amount DPM during the temperature-increasing process. Alternatively, for example, when the duration of the temperature-increasing process reaches a preset time, it may be determined that the deposition amount DPM becomes less than or equal to the given amount may be determined.

The operation and advantages of the present embodiment will now be described.

When the deposition amount DPM becomes greater than or equal to the threshold value DPMth, the CPU 72 executes the temperature-increasing process as a process that regenerates the GPF 34. This allows the air drawn into cylinder #1 in the intake stroke of cylinder #1 to flow out to the exhaust passage 30 in the exhaust stroke of cylinder #1 without being burned. The air-fuel mixture of cylinders #2 to #4 is richer than the stoichiometric air-fuel ratio. Thus, the exhaust gas discharged from cylinders #2 to #4 to the exhaust passage 30 includes a vast amount of unburned fuel. The oxygen and unburned fuel discharged to the exhaust passage 30 increase the temperature of the GPF 34 when burned in the three-way catalyst 32 or the like. The oxygen in the air that has flowed to the exhaust passage 30 oxidizes PM in the GPF 34, thereby burning and removing the PM.

When fuel is injected from the port injection valves 16 of cylinders #2 to #4 in the temperature-increasing process, some of the injected fuel remains in the intake system without flowing into the combustion chamber 20 even during the open period of the intake valve 18 of a corresponding one of cylinders #2 to #4. The fuel in the intake system may flow into the combustion chamber 20 of cylinder #1 during the open period of the intake valve 18 of cylinder #1 and may be burned in the combustion chamber 20 of cylinder #1. At least some of the combustion energy produced when the fuel is burned in the combustion chamber 20 of cylinder #1 is converted into the power of the crankshaft 26. This indicates that the fuel of cylinders #2 to #4 that has been increased in order to increase the temperature of the exhaust system relative to the fuel amount serving as the stoichiometric air-fuel ratio is converted into the power of the crankshaft 26 instead of being used to increase the temperature of the exhaust system as intended. That is, the efficiency of the temperature-increasing process decreases.

To solve this problem, when the CPU 72 executes the temperature-increasing process, the CPU 72 corrects the injection distribution ratio Kp such that the ratio decreases. Thus, the fuel used to enrich the air-fuel mixture in the combustion chambers 20 of cylinders #2 to #4 is prevented from being burned in the combustion chamber 20 of cylinder #1. Consequently, the temperature-increasing efficiency of the GPF 34 is kept high.

The above-described present embodiment further provides the following operation and advantage.

(1) When the temperature-increasing process is executed, the closing timing of the intake valve 18 is corrected such that the closing timing advances. This prevents the fuel in the combustion chambers 20 of cylinders #2 to #4 from flowing out to the intake port 12a before the intake valve 18 opens. When the fuel in the combustion chambers 20 of cylinders #2 to #4 flow into the intake port 12a, the fuel may flow into the combustion chamber 20 of cylinder #1 during the open period of the intake valve 18 of cylinder #1 and may be burned in the combustion chamber 20 of cylinder #1. Such a problem is overcome by correcting the closing timing of the intake valve 18 such that the timing advances.

Second Embodiment

A second embodiment will now be described with reference to FIGS. 4 to 7. The differences from the first embodiment will mainly be discussed.

Figure 4:
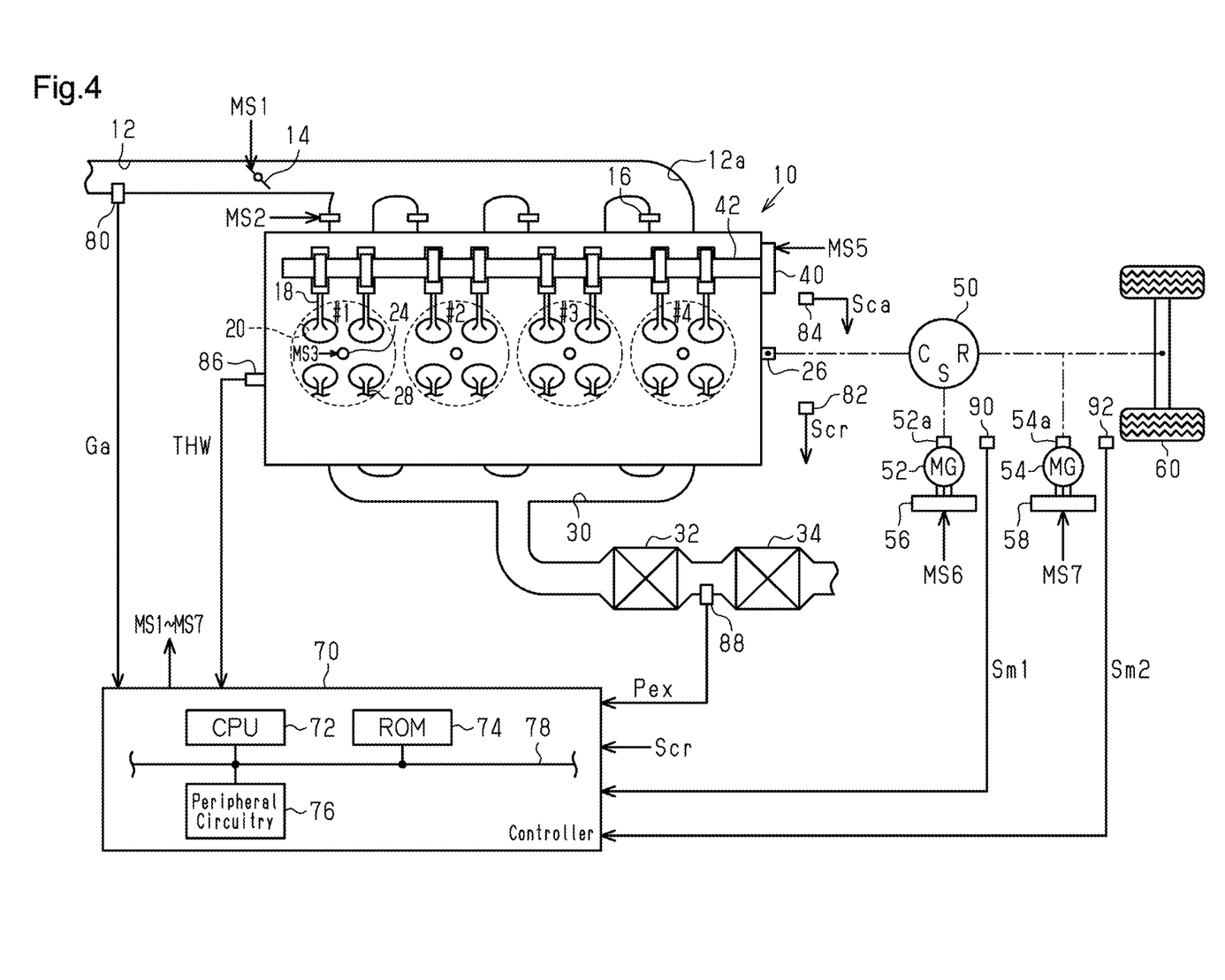
FIG. 4 is a diagram showing a controller and a drive system according to a second embodiment.

FIG. 4 shows the configuration of a drive system and a control system for the driving system according to the present embodiment. In FIG. 4, the same reference numerals are given to the components that are the same as those in FIG. 1 for illustrative purposes.

Referring to FIG. 4, the internal combustion engine 10 of the present embodiment does not include the direct injection valves 22.

Figure 5:
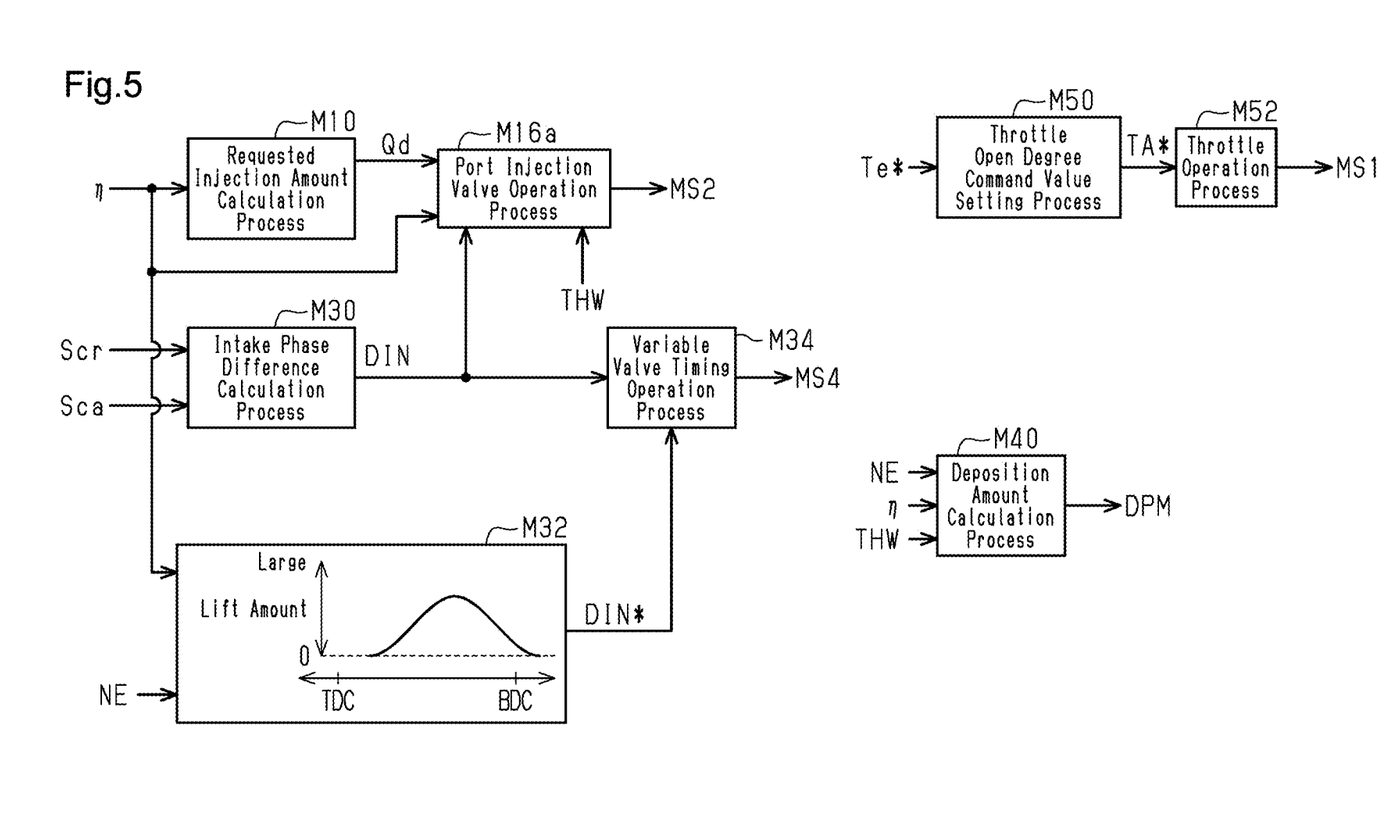
FIG. 5 is a block diagram showing processes executed by the controller of the embodiment.

FIG. 5 shows the processes executed by the controller 70 of the present embodiment. In FIG. 5, the same reference numerals are given to the processes that correspond to those in FIG. 3.

As shown in FIG. 5, a port injection valve operation process M16a of the present embodiment operates the port injection valve 16 using the requested injection amount Qd, the charging efficiency η, the water temperature THW, and the intake phase difference DIN.

Figure 6:
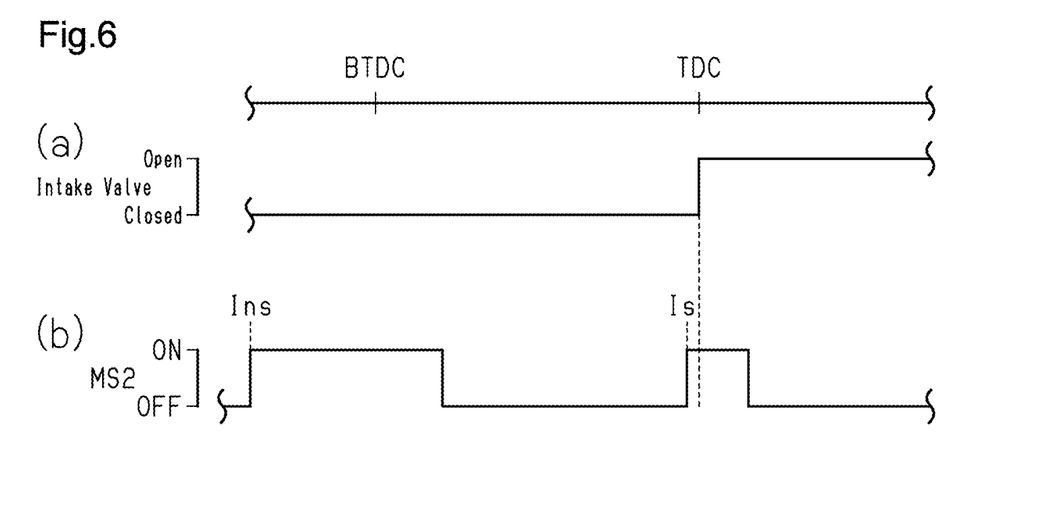
FIG. 6 is a timing diagram that includes section (a) and section (b), each illustrating an injection pattern of the embodiment.

FIG. 6 illustrates the patterns of fuel injection executed by the port injection valve operation process M16a. Section (a) of FIG. 6 shows a change in the open state and the close state of the intake valve 18. Section (b) of FIG. 6 shows changes in the operation signal MS2 for the port injection valve 16. In the period of section (b) of FIG. 6 during which the operation signal MS2 is ON, fuel is injected from the port injection valve 16.

Referring to FIG. 6, in the present embodiment, a multiple injection process is executed to execute two types of fuel injection, namely, intake synchronous injection and intake asynchronous injection. In the intake synchronous injection, fuel is injected in synchronization with the open period of the intake valve 18. In the intake asynchronous injection, fuel is injected at a timing advanced with respect to the timing of the intake synchronous injection. More specifically, the intake synchronous injection is to inject fuel such that the period in which the fuel injected from the port injection valve 16 reaches the position of the intake valve 18 prior to opening is within the open period of the intake valve 18. The position of the intake valve 18 prior to opening is the downstream end of the intake port, that is, the inlet of the intake port for the combustion chamber 20. The starting point of the fuel-reaching period is the timing at which the fuel injected from the port injection valve 16 at the earliest timing in the fuel injected from the port injection valve 16 reaches the position of the intake valve 18 prior to opening. The ending point of the fuel-reaching period is the timing at which the fuel injected from the port injection valve 16 at the latest timing in the fuel injected from the port injection valve 16 reaches the position of the intake valve 18 prior to opening. Section (b) of FIG. 6 shows that a start timing Is of the intake synchronous injection is advanced with respect to the open period of the intake valve 18. This is because sufficient time is needed for the fuel injected from the port injection valve 16 to reach the vicinity of the intake valve 18.

The intake asynchronous injection is to inject fuel such that the fuel injected from the port injection valve 16 reaches the intake valve 18 before the intake valve 18 opens. In other words, in the intake asynchronous injection, the fuel injected from the port injection valve 16 remains in the intake passage 12 until the intake valve 18 opens, and the fuel that remains in the intake passage 12 flows into the combustion chamber 20 after the intake valve 18 opens. In the present embodiment, in the intake asynchronous injection, fuel is injected such that the period in which the fuel injected from the port injection valve 16 reaches the position of the intake valve 18 prior to opening is within the closed period of the intake valve 18. Section (b) of FIG. 6 shows a start timing Ins of the intake asynchronous injection.

Figure 7:
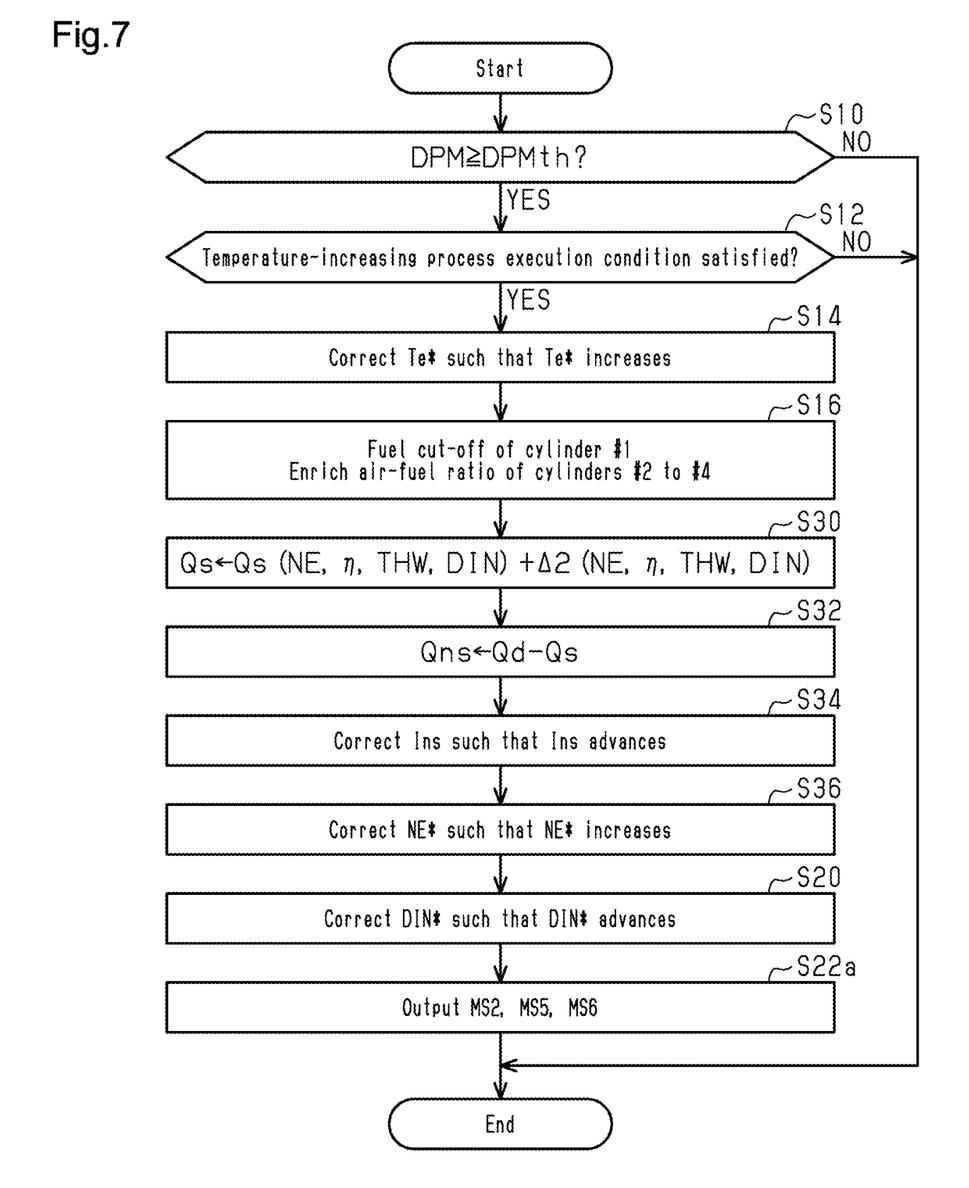
FIG. 7 is a flowchart showing a procedure of processes executed by the controller of the embodiment.

FIG. 7 illustrates a procedure of processes executed by the controller 70. The processes shown in FIG. 7 are executed by the CPU 72 repeatedly executing programs stored in the ROM 74, for example, in a predetermined cycle. In FIG. 7, the same step numbers are given to the processes that correspond to those in FIG. 3.

In a series of processes shown in FIG. 7, the CPU 72 executes the processes of S10 to S16 and then calculates a synchronous injection amount Qs, which is an injection amount of synchronous injection (S30). The CPU 72 first uses the rotation speed NE, the charging efficiency η, the water temperature THW, and the intake phase difference DIN to calculate the same synchronous injection amount Qs as that obtained when the temperature-increasing process is not executed. For example, this process simply needs to be executed by the CPU 72 performing map calculation of the synchronous injection amount Qs with the ROM 74 storing, in advance, map data that includes the rotation speed NE, the charging efficiency η, the water temperature THW, and the intake phase difference DIN as input variables and includes the synchronous injection amount Qs as an output variable. Further, the CPU 72 calculates a given amount 42 in reference to a variable used to calculate the synchronous injection amount Qs that is based on an increase correction of the synchronous injection amount Qs. The given amount 42 is used to correct the synchronous injection amount Qs during the temperature-increasing process such that the amount increases. That is, the given amount 42 is calculated using the rotation speed NE, the charging efficiency η, the water temperature THW, and the intake phase difference DIN. For example, the process that calculates the given amount 42 simply needs to be executed by the CPU 72 performing map calculation of the given amount 42 with the ROM 74 storing, in advance, map data that includes the rotation speed NE, the charging efficiency η, the water temperature THW, and the intake phase difference DIN as input variables and includes the given amount 42 as an output variable.

Then, the CPU 72 corrects the synchronous injection amount Qs such that the amount is increased by the given amount 42.

Subsequently, the CPU 72 subtracts the synchronous injection amount Qs from the requested injection amount Qd and substitutes the subtracted value into the asynchronous injection amount Qns, which is an injection amount of the intake asynchronous injection (S32). Then, the CPU 72 corrects the start timing Ins of the asynchronous injection such that the timing advances with respect to a normal value obtained when the temperature-increasing process is not executed (S34). Further, the CPU 72 corrects a rotation speed command value NE*, which is a command value of the rotation speed NE, such that the rotation speed command value NE* becomes larger than the normal value obtained when the temperature-increasing process is not executed (S36). In reality, the increase correction of the engine torque command value Te* in the process of S14 is executed in reference to the increase correction amount of the rotation speed command value NE*. That is, the process of S14 is executed such that the product of the engine torque command value Te* that has been corrected so as to increase and the rotation speed command value NE* that has been corrected so as to increase becomes the requested output for the internal combustion engine 10. In addition, the CPU 72 executes the process of S20.

Then, the CPU 72 outputs the operation signals MS2, MS5, MS6 in correspondence with the processes of S30 to S36 and S20 (S22a). That is, the CPU 72 outputs the operation signal MS2 to the port injection valve 16 in order to operate the port injection valve 16 in correspondence with the synchronous injection amount Qs and the asynchronous injection amount Qns. Further, the CPU 72 operates the inverter 56 by outputting the operation signal MS6 to the inverter 56 of the first motor generator 52 in order to perform feedback control to set the rotation speed NE to the rotation speed command value NE* that has been corrected so as to increase.

When completing the process of S22a or when making a negative determination in the process of S10 or S12, the CPU 72 temporarily ends the series of processes shown in FIG. 7. If the temperature-increasing process is not executed, the CPU 72 operates the port injection valve 16 using the synchronous injection amount Qs that is not corrected using the given amount 42.

The above-described present embodiment further provides the following advantage in addition to the above-described advantage (1).

(2) When the temperature-increasing process is executed, the CPU 72 corrects the synchronous injection amount Qs such that the amount increases. Thus, the injection amount of the asynchronous injection decreases. This prevents the fuel injected by the intake asynchronous injection in cylinders #2 to #4 from remaining in the portions of the intake system that correspond to cylinders #2 to #4 without flowing into the combustion chambers 20 during the open period of the intake valves 18.

(3) When the temperature-increasing process is executed, the CPU 72 corrects the start timing Ins of the intake asynchronous injection such that the amount advances. Thus, as compared with when the advancement correction is not made, sufficient time is provided for the fuel injected by the intake asynchronous injection in each of cylinders #2 to #4 to be atomized before the open period of the corresponding intake valve 18 ends. Further, the atomized fuel can be drawn into each combustion chamber 20 within the open period of the corresponding intake valve 18.

(4) When the temperature-increasing process is executed, the CPU 72 increases the rotation speed NE of the internal combustion engine 10. Thus, as compared with when the rotation speed NE is not increased, a fluid (such as intake air) flows at a higher speed from the intake port 12a into each combustion chamber 20 during the open period of the corresponding intake valve 18. When the flow speed of fluid (such as intake air) is high, fuel is prevented from collecting in the intake system more easily and the fuel in the intake system flows into the combustion chamber 20 more easily than when the flow speed of fluid is low. Thus, an increase in the rotation speed NE of the internal combustion engine 10 prevents the fuel injected by the intake asynchronous injection in cylinders #2 to #4 from collecting in the intake system and reduces the amount of fuel that remains in the intake system without flowing into the combustion chamber 20 during the open period of the intake valve 18.

Correspondence

The correspondence between the items in the above-described embodiments and the items described in the above-described SUMMARY is as follows. In the following description, the correspondence is shown for each of the numbers in the examples described in the SUMMARY.

Regarding Aspect 1, the controller corresponds to the controller 70. The adjustment device corresponds to the throttle valve 14, the port injection valve 16, the direct injection valve 22, the variable valve timing device 40, and the inverter 56.

The aftertreatment device corresponds to the GPF 34.

The determination process corresponds to the process of S10. The temperature-increasing process corresponds to the process of S16.

The operation process corresponds to the processes of S18 to S22 in FIG. 3 and the processes of S30 to S36, S20, S22a in FIG. 7.

Regarding Aspect 2, the setting process corresponds to the setting process M12.

The injection distribution process corresponds to the port injection valve operation process M16 and the direct injection valve operation process M22.

Regarding Aspects 3 and 4, the supplying process corresponds to the port injection valve operation process M16a.

Regarding Aspect 5, the adjustment device corresponds to the inverter 56. The increasing process corresponds to the processes of S36, S22a.

Regarding Aspect 6, the valve actuation variable device corresponds to the variable valve timing device 40.

Modifications

The present embodiments may be modified as follows. The above-described embodiments and the following modifications can be combined as long as the combined modifications remain technically consistent with each other.

Setting Process

The setting process that sets the injection distribution ratio Kp, which is the ratio of fuel injected from the port injection valve 16, does not have to be performed in the manner shown in FIG. 2. Instead, for example, when the internal combustion engine 10 with a low water temperature THW is started, the injection distribution ratio Kp may be set to 0 in order for the direct injection valve 22 to execute a process that rapidly warms the three-way catalyst 32.

Supplying Process

In the process on the right side of the expression of S30 in FIG. 7, the rotation speed NE, the charging efficiency η, the water temperature THW, and the intake phase difference DIN are used to define the synchronous injection amount Qs obtained when the temperature-increasing process is not executed. However, such a configuration does not have to be employed. The variable indicating load on the internal combustion engine 10 is not limited to the charging efficiency η and may be, for example, an accelerator operation amount. Additionally, the variable indicating valve actuation is not limited to the intake phase difference. As described in the Modification Related to Valve Actuation Variable Device section below, for example, when a device that varies the lift amount of the intake valve is employed to vary the valve actuation of the intake valve, the variable indicating valve actuation may be a variable indicating the lift amount.

The variables used to define the synchronous injection amount Qs obtained when the temperature-increasing process is not executed are not limited to the four variables, namely, the rotation speed NE, the variable indicating load, the water temperature THW, and the variable indicating the valve actuation of the intake valve. Instead, only three of the four variables may be used. Alternatively, for example, only two of the four variables may be used. As another option, for example, only one of the four variables may be used. The injection amount that is directly calculated using these variables is not limited to the synchronous injection amount Qs and may be the asynchronous injection amount Qns.

Modification Related to Operating Process (a) Process that Reduces Injection Distribution Ratio Kp In the process of S18 in FIG. 3, the predetermined amount Δ1, from which the injection distribution ratio Kp is subtracted, is variably set in correspondence with the rotation speed NE and the charging efficiency η. However, such a configuration does not have to be employed. Instead, for example, the predetermined amount Δ1 may be variably set using only one of the rotation speed NE and the charging efficiency η. Additionally, the predetermined amount Δ1 may be a fixed value. In these cases, the larger one of 0 and the value obtained by correcting the injection distribution ratio Kp such that the ratio decreases by the predetermined amount Δ1 is set as the final injection distribution ratio Kp.

In the process of FIG. 3, the injection distribution ratio Kp is corrected such that the ratio decreases by the predetermined amount 41. However, such a configuration does not have to be employed. For example, this process may multiply the injection distribution ratio Kp by a correction coefficient that is greater than or equal to 0 and less than 1.

When the temperature-increasing process is executed, the injection distribution ratio Kp may be uniformly set to 0.

(b) Process that Increases Ratio of Synchronous Injection Amount

In the process of S30 in FIG. 7, the given amount 42, which is used to increase the ratio of the synchronous injection amount Qs, is variably set in correspondence with the rotation speed NE, the charging efficiency η, the water temperature THW, and the intake phase difference DIN. However, such a configuration does not have to be employed. For example, the variable indicating load on the internal combustion engine 10 is not limited to the charging efficiency η and may be an accelerator operation amount. Additionally, the variable indicating valve actuation is not limited to the intake phase difference. As described in the Modification Related to Valve Actuation Variable Device section below, for example, when a device that varies the lift amount of the intake valve is employed to vary the valve actuation of the intake valve, the variable indicating valve actuation may be a variable indicating the lift amount.

The variables used to define the synchronous injection amount Qs, which is used to increase the ratio of the synchronous injection amount Qs, are not limited to the four variables, namely, the rotation speed NE, the variable indicating load, the water temperature THW, and the variable indicating the valve actuation of the intake valve. For example, only three of the four variables may be used. Alternatively, only two of the four variables may be used. As another option, only one of the four variables may be used. Additionally, the given amount 42 may be a fixed value. In these cases, a guard process is executed in order to set the final synchronous injection amount Qs to be less than or equal to the requested injection amount Qd.

In the process of FIG. 7, the synchronous injection amount Qs is corrected such that the amount increases by the given amount 42. However, such a configuration does not have to be employed. Instead, for example, the synchronous injection amount Qs may be multiplied by a correction coefficient that is greater than 1. In this case, a guard process is executed in order to set the final synchronous injection amount Qs to be less than or equal to the requested injection amount Qd.

When the temperature-increasing process is executed, the asynchronous injection amount Qns may be uniformly set to 0.

The process that increases the ratio of the synchronous injection amount does not necessarily have to be executed. Instead, for example, a configuration may be employed in which a process that advances the start timing Ins is executed and the process that increases the ratio of the synchronous injection amount is not executed.

(c) Process that Advances Start Timing Ins of Asynchronous Injection

In the process of S34 in FIG. 7, when the temperature-increasing process is executed, the start timing Ins can be a preset fixed value. However, such a configuration does not have to be employed. Instead, the start timing Ins may be variably set using, for example, the rotation speed NE.

The process that advances the start timing Ins does not necessarily have to be executed. Instead, for example, when the temperature-increasing process is executed, a configuration may be employed in which the process that increases the ratio of the synchronous injection amount Qs is executed and a normal start timing Ins is used.

(d) Process that Increases Rotation Speed

In the process of S36 in FIG. 7, the torque of the first motor generator 52 is used to increase the rotation speed NE of the internal combustion engine 10. However, such a configuration does not have to be employed. For example, as described in the Modification Related to Vehicle section, in the case of a vehicle in which only the internal combustion engine is used as the vehicle on-board power generation device, a transmission is arranged between the internal combustion engine 10 and the driven wheels 60. The rotation speed may be increased by adjusting the gear ratio of the transmission.

The process that increases the rotation speed NE during the temperature-increasing process does not necessarily have to be executed.

(f) Process that Advances Closing Timing of Intake Valve

In the process of S20 in FIGS. 3 and 7, the intake phase difference command value DIN* is advanced to a preset value during the temperature-increasing process. However, such a configuration does not have to be employed. For example, the advancement correction amount of the intake phase difference command value DIN* may be variably set in correspondence with the rotation speed NE or the charging efficiency η.

The opening timing of the intake valve 18 does not necessarily have to be corrected during the temperature-increasing process such that the timing is advanced, for example, when the normal opening timing of the intake valve 18 is sufficiently close to before-top-dead-center (BTDC) or is advanced with respect to BTDC.

(g) Other Modifications

When the internal combustion engine 10 includes an exhaust gas recirculation (EGR) passage through which the exhaust gas discharged to the exhaust passage 30 flows into the intake passage 12 and includes an adjustment device that adjusts the amount of the exhaust gas flowing from the EGR passage to the intake passage 12, the amount of the exhaust gas flowing from the EGR passage to the intake passage 12 during the execution of the temperature-increasing process may be limited to a smaller value such as 0. This is achieved by, for example, using the adjustment device as an EGR valve that adjusts the cross-sectional flow area of the EGR passage and closing the EGR valve when the temperature-increasing process is executed.

For example, when the internal combustion engine includes a canister that traps fuel vapor in a fuel tank storing fuel that is supplied to the port injection valve 16 and the direct injection valve 22, a purge passage through which the fuel trapped by the canister is emitted to the intake passage 12, and an adjustment device that adjusts the amount of fuel vapor that is emitted through the purge passage to the intake passage 12, the following process may be executed. First, as a precondition for executing the temperature-increasing process, a process is executed to correct the requested injection amount Qd in correspondence with the amount of fuel vapor emitted through the purge passage to the intake passage 12 such that the requested injection amount Qd decreases. Then, when the temperature-increasing process is executed, the amount of fuel vapor emitted through the purge passage to the intake passage 12 may be limited to a smaller value such as 0. For example, this is achieved by using, as the adjustment device, a purge valve that adjusts the cross-sectional flow area of the purge passage and closing the purge valve when the temperature-increasing process is executed.

When the internal combustion engine 10 includes a blow-by gas passage through which the blow-by gas stored in the crankcase is returned to the intake passage and includes an adjustment device that adjusts the amount of the blow-by gas flowing through the blow-by gas passage into the intake passage, the amount of the blow-by gas flowing into the intake passage during the execution of the temperature-increasing process may be limited to a smaller value such as 0. This process is particularly effective when, for example, the requested injection amount Qd is reduced in correspondence with the flow rate of the blow-by gas flowing into the intake passage. For example, this is achieved by using, as the adjustment device, a positive crankcase ventilation (PCV) valve that adjusts the cross-sectional flow area of the blow-by gas passage and closing the PCV valve when the temperature-increasing process is executed.

Modification Related to Estimation of Deposition Amount

The process that estimates the deposition amount DPM is not limited to the one illustrated in FIG. 2. For example, the deposition amount DPM may be estimated using the intake air amount Ga and the pressure difference between the upstream side and the downstream side of the GPF 34. More specifically, the deposition amount DPM is estimated to be a larger value when the pressure difference is large than when the pressure difference is small. Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the above-described pressure Pex may be used instead of the pressure difference.

Modification Related to Valve Actuation Variable Device

The valve actuation variable device that changes the characteristics of the intake valve 18 is not limited to the variable valve timing device 40. For example, the valve actuation variable device may be a device that changes the lift amount of the intake valve 18.

Modification Related to Aftertreatment Device

The GPF 34 is not limited to the filter supported by the three-way catalyst and may include only the filter. Further, the GPF 34 does not have to be located on the downstream side of the three-way catalyst 32 in the exhaust passage 30. Furthermore, the aftertreatment device does not necessarily have to include the GPF 34. For example, even when the aftertreatment device includes only the three-way catalyst 32, the processes illustrated in the above-described embodiments and the modifications are effectively executed during the temperature-increasing process of the aftertreatment device.

Modification Related to Controller

The controller is not limited to a device that includes the CPU 72 and the ROM 74 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c): (a) a configuration including a processor that executes all of the above-described processes according to programs and a program storage device such as a ROM (including a non-transitory computer readable medium) that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software processing circuits each including a processor (processing circuit) and a program storage device (memory circuit) and a plurality of dedicated hardware circuits may be provided. That is, the above-described processes may be executed in any manner as long as the processes are executed by an execution device that includes at least one of one or more software processing circuits and one or more dedicated hardware circuits.

Modification Related to Vehicle

The vehicle is not limited to a series-parallel hybrid vehicle and may be, for example, a parallel hybrid vehicle or a series-parallel hybrid vehicle. The hybrid vehicle may be replaced with, for example, a vehicle in which only the internal combustion engine 10 is used as the vehicle on-board power generation device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the controller controlling the internal combustion engine including cylinders, wherein
    the internal combustion engine includes an adjustment device, an exhaust passage, and an aftertreatment device for exhaust gas, the aftertreatment device being arranged in the exhaust passage,
    the adjustment device is configured to adjust a fuel concentration in an intake port connected to a specified cylinder during a specified-cylinder deactivation period, the specified cylinder being one of the cylinders, the specified-cylinder deactivation period being a period during which supply of fuel by a fuel injection valve corresponding to the specified cylinder is deactivated, and
    the controller is configured to execute:
        a determination process that determines whether an execution request of a temperature-increasing process for the aftertreatment device has been issued;
        the temperature-increasing process that deactivates the supply of the fuel by the fuel injection valve corresponding to the specified cylinder and sets an air-fuel ratio of air-fuel mixture in a cylinder of the cylinders that differs from the specified cylinder to be richer than a stoichiometric air-fuel ratio when the determination process determines that the execution request has been issued; and
        an operation process that operates the adjustment device so as to reduce the fuel concentration in the intake port connected to the specified cylinder when the temperature-increasing process is executed.

2. The controller according to claim 1, wherein
the fuel injection valve includes a direct injection valve that directly injects fuel into one of the cylinders and a port injection valve that injects fuel into the intake port,
the adjustment device includes the fuel injection valve,
the controller is further configured to execute:
    a setting process that sets an injection distribution ratio in correspondence with a running state of the internal combustion engine, the injection distribution ratio being a ratio of an amount of fuel supplied by the port injection valve to an amount of fuel supplied to the cylinder using the fuel injection valve; and
    an injection distribution process that operates the direct injection valve and the port injection valve in reference to the injection distribution ratio, and
the operation process includes the injection distribution process that operates the direct injection valve and the port injection valve such that a value of the injection distribution ratio obtained when the temperature-increasing process is executed becomes smaller than a value of the injection distribution ratio set by the setting process.

3. The controller according to claim 1, wherein
the fuel injection valve includes a port injection valve that injects fuel into the intake port,
the adjustment device includes the port injection valve,
the controller is configured to execute a supplying process that supplies fuel into one of the cylinders using the port injection valve through at least one of intake synchronous injection or intake asynchronous injection, the intake synchronous injection injecting fuel in synchronization with an open period of an intake valve, the intake asynchronous injection injecting fuel at a timing advanced with respect to a timing of the intake synchronous injection, and
the operation process includes the supplying process that operates the port injection valve such that a ratio of a synchronous injection amount to a sum of the synchronous injection amount and an asynchronous injection amount increases when the temperature-increasing process is executed, the synchronous injection amount being an injection amount obtained through the intake synchronous injection, the asynchronous injection amount being an injection amount obtained through the intake asynchronous injection.

4. The controller according to claim 1, wherein
the fuel injection valve includes a port injection valve that injects fuel into the intake port,
the adjustment device includes the port injection valve,
the controller is configured to execute a supplying process that supplies fuel into the one of the cylinders using the port injection valve through at least one of intake synchronous injection or intake asynchronous injection, the intake synchronous injection injecting fuel in synchronization with an open period of an intake valve, the intake asynchronous injection injecting fuel at a timing advanced with respect to a timing of the intake synchronous injection, and
the operation process includes the supplying process that operates the port injection valve while advancing an injection timing of fuel through the intake asynchronous injection when the temperature-increasing process is executed.

5. The controller according to claim 3, wherein
the adjustment device includes a device that adjusts a rotation speed of the crankshaft of the internal combustion engine, and
the operation process includes an increasing process that increases the rotation speed of the crankshaft by operating the adjustment device when the temperature-increasing process is executed.

6. The controller according to claim 1, wherein
the adjustment device includes a valve actuation variable device that adjusts a closing timing of an intake valve, and the operation process includes a process that advances the closing timing when the temperature-increasing process is executed.

7. A control method for controlling an internal combustion engine including cylinders, wherein the internal combustion engine includes an adjustment device, an exhaust passage, and an aftertreatment device for exhaust gas, the aftertreatment device being arranged in the exhaust passage, the control method comprises:

adjusting, by the adjustment device, a fuel concentration in an intake port connected to a specified cylinder during a specified-cylinder deactivation period, the specified cylinder being one of the cylinders, the specified-cylinder deactivation period being a period during which supply of fuel by a fuel injection valve corresponding to the specified cylinder is deactivated;

determining whether an execution request of a temperature-increasing process for the aftertreatment device has been issued;

deactivating the supply of the fuel by the fuel injection valve corresponding to the specified cylinder and setting an air-fuel ratio of air-fuel mixture in a cylinder of the cylinders that differs from the specified cylinder to be richer than a stoichiometric air-fuel ratio when determining that the execution request has been issued; and operating the adjustment device so as to reduce the fuel concentration in the intake port connected to the specified cylinder when the temperature-increasing process is executed.

8. A non-transitory computer-readable memory medium that stores a program for causing a processor to execute a control process for controlling an internal combustion engine including cylinders, wherein the internal combustion engine includes an adjustment device, an exhaust passage, and an aftertreatment device for exhaust gas, the aftertreatment device being arranged in the exhaust passage, the control process comprises:

adjusting, by the adjustment device, a fuel concentration in an intake port connected to a specified cylinder during a specified-cylinder deactivation period, the specified cylinder being one of the cylinders, the specified-cylinder deactivation period being a period during which supply of fuel by a fuel injection valve corresponding to the specified cylinder is deactivated;

determining whether an execution request of a temperature-increasing process for the aftertreatment device has been issued;

deactivating the supply of the fuel by the fuel injection valve corresponding to the specified cylinder and setting an air-fuel ratio of air-fuel mixture in a cylinder of the cylinders that differs from the specified cylinder to be richer than a stoichiometric air-fuel ratio when determining that the execution request has been issued; and operating the adjustment device so as to reduce the fuel concentration in the intake port connected to the specified cylinder when the temperature-increasing process is executed.

* * * * *